US005435406A

United States Patent [19]

[11] Patent Number: 5,435,406

[45] Date of Patent: Jul. 25, 1995

Gaffoglio et al.

[54] VEHICLE HOOD MOUNTING ARRANGEMENT

[75] Inventors: Ruben E. Gaffoglio; Genaro Prats, both of Mission Viejo, Calif.

[73] Assignee: Chrysler Corporation, Highland Park, Mich.

[21] Appl. No.: 153,207

[22] Filed: Nov. 16, 1993

[51] Int. Cl.$^6$ ........................ B62D 25/10; B62D 25/12

[52] U.S. Cl. .................................... 180/69.21; 49/261; 296/146.12

[58] Field of Search ................ 180/69.21, 69.22, 69.23; 49/248, 261, 339, 340; 296/76, 146.12

[56] References Cited

U.S. PATENT DOCUMENTS

| | | | |
|---|---|---|---|
| 2,154,733 | 4/1939 | Orlow . | |
| 2,548,492 | 4/1951 | Rivard et al. | 180/69.21 |
| 2,936,842 | 5/1960 | Fallin et al. | 180/69.21 |
| 3,113,339 | 12/1963 | Krause . | |
| 3,556,240 | 1/1971 | Hartman | 180/69.21 |
| 3,767,001 | 10/1973 | Chupick . | |
| 3,815,176 | 6/1974 | Porter . | |
| 4,125,170 | 11/1978 | Botz . | |
| 4,134,179 | 1/1979 | Silaghi . | |
| 4,530,412 | 7/1985 | Sigety, Jr. . | |
| 4,658,470 | 4/1987 | Oen . | |
| 4,790,588 | 12/1988 | Corson . | |
| 4,991,675 | 2/1991 | Tosconi et al. . | |
| 5,101,921 | 4/1992 | West et al. . | |
| 5,136,752 | 8/1992 | Bening et al. | 161/287 |

FOREIGN PATENT DOCUMENTS

| | | | |
|---|---|---|---|
| 619830 | 5/1961 | Canada | 180/69.21 |
| 811780 | 6/1951 | Germany | 180/69.21 |
| 1428622 | 10/1888 | U.S.S.R. | 180/69.21 |
| 8102872 | 10/1981 | WIPO | 180/69.2 |

*Primary Examiner*—Brian L. Johnson
*Attorney, Agent, or Firm*—Mark P. Calcaterra

[57] ABSTRACT

A vehicle hood-mounting arrangement includes a hinge member and an actuator for rotating the hinge member about a first axis of rotation. The hinge member is attached to a vehicle hood at a second axis of rotation. During rotation between a fully opened position and a fully closed position, the vehicle hood translates horizontally and forwardly. Preferably, the vehicle hood mounting arrangement also includes an H-shaped linkage for supporting and stabilizing the vehicle hood.

18 Claims, 5 Drawing Sheets

VEHICLE HOOD MOUNTING ARRANGEMENT

BACKGROUND OF THE INVENTION

This invention relates generally to a mounting arrangement for a vehicle body compartment panel. More particularly, the present invention relates to a mounting arrangement for a vehicle hood adapted for closing the access opening of a forward vehicle engine compartment.

It is known to provide a mounting arrangement supporting a vehicle body compartment panel, such as a vehicle hood, for pivotal movement between a closed position and an open position about a single axis of rotation. The pivotal movement of the vehicle panel between the open and closed positions is limited in certain mounting arrangements by vehicle body geometrical restraints. During pivotal movement of a typical vehicle panel to the fully open position, a main portion of the panel moves pivotally upward about an axis of rotation, while a portion of the panel on the opposite side of the axis of rotation pivotally moves downward. This downward movement of a portion of the panel necessarily limits opening movement of the hood upon engagement with the vehicle body or will limit the usable space of the compartment if it moves downward through the compartment opening.

While known vehicle hood mounting arrangements have proven to be effective in enclosing vehicle engine compartments, they have several disadvantages. For example, typical vehicle hood mounting arrangements require mounting the vehicle hood for rotation at spaced apart points. Such a construction inherently restrains the geometry of the pivotally mounted end of the vehicle hood. Other known vehicle hood mounting arrangements include a portion which extends downward into the engine compartment thereby limiting usable space. Still yet, some prior vehicle hood mounting arrangements position the pivotal axis to pass through the vehicle body confines adjacent the end of the vehicle body, thereby allowing a downwardly moving panel portion to essentially tip over the end of the vehicle. The panel resultantly limits access to the end of the vehicle body when the head is positioned in the fully opened position.

Accordingly, it is desired to provide a vehicle hood mounting arrangement which permits the vehicle hood to rotate about an axis without extending beyond the confines of the vehicle body or unnecessarily extending into the vehicle engine compartment.

SUMMARY OF THE INVENTION

The present invention provides a vehicle hood mounting arrangement adapted for a conventional vehicle of the type having a body and a forwardly located engine compartment partially defined by a pivotally mounted vehicle hood. In the preferred embodiment, the vehicle hood mounting arrangement includes a hinge member with a first axis of rotation passing therethrough for pivotally interconnection to the body of a vehicle. The hinge member also includes a second axis of rotation which passes therethrough, at which the hinge member is pivotal attached to the vehicle hood. The vehicle hood mounting arrangement further includes an actuator for rotating the hinge member about the first axis of rotation. The vehicle hood mounting arrangement permits the vehicle hood to translate slightly horizontally and simultaneously rotate with respect to the first axis of rotation of the hinge member as the hood moves between an open position and a closed position.

BRIEF DESCRIPTION OF THE DRAWINGS

Other features of the present invention will become apparent from the following detailed description of the preferred embodiment and the drawings in which.

DETAILED DESCRIPTION OF THE PREFERRED EMBODIMENT

Figure 1:
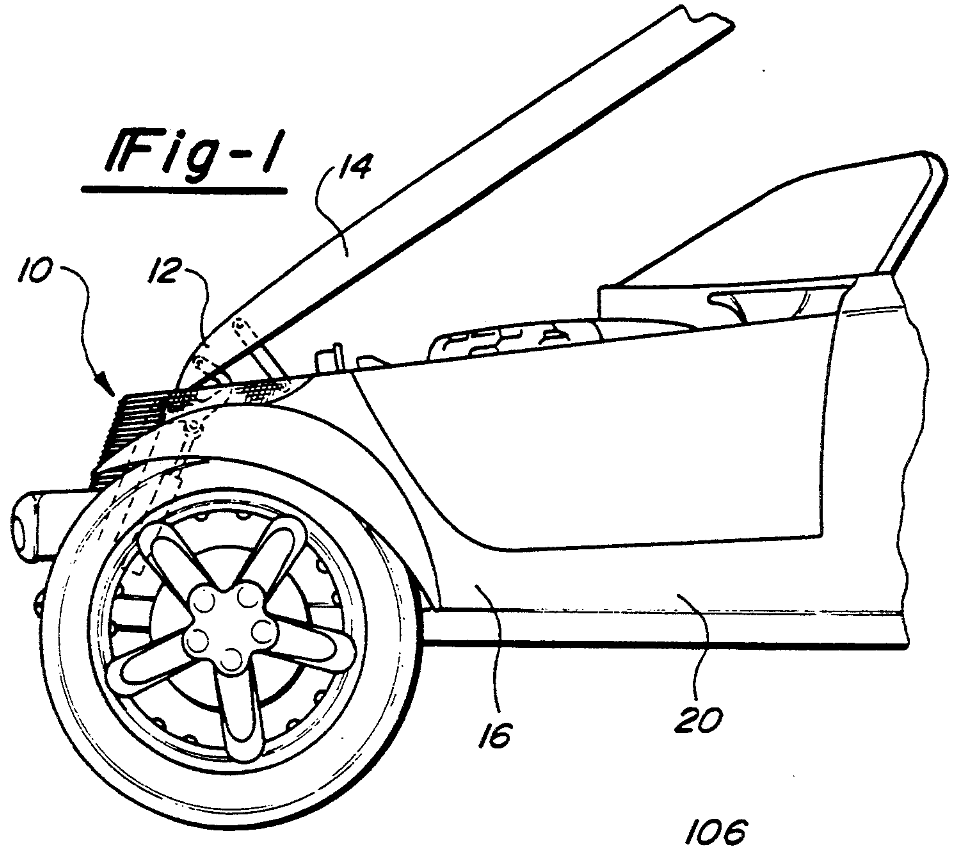
FIG. 1 is a partial side elevational view of a vehicle incorporating a vehicle hood mounting arrangement constructed according to the present invention with the vehicle hood and vehicle hood mounting arrangement shown in partial open position.
Figure 2:
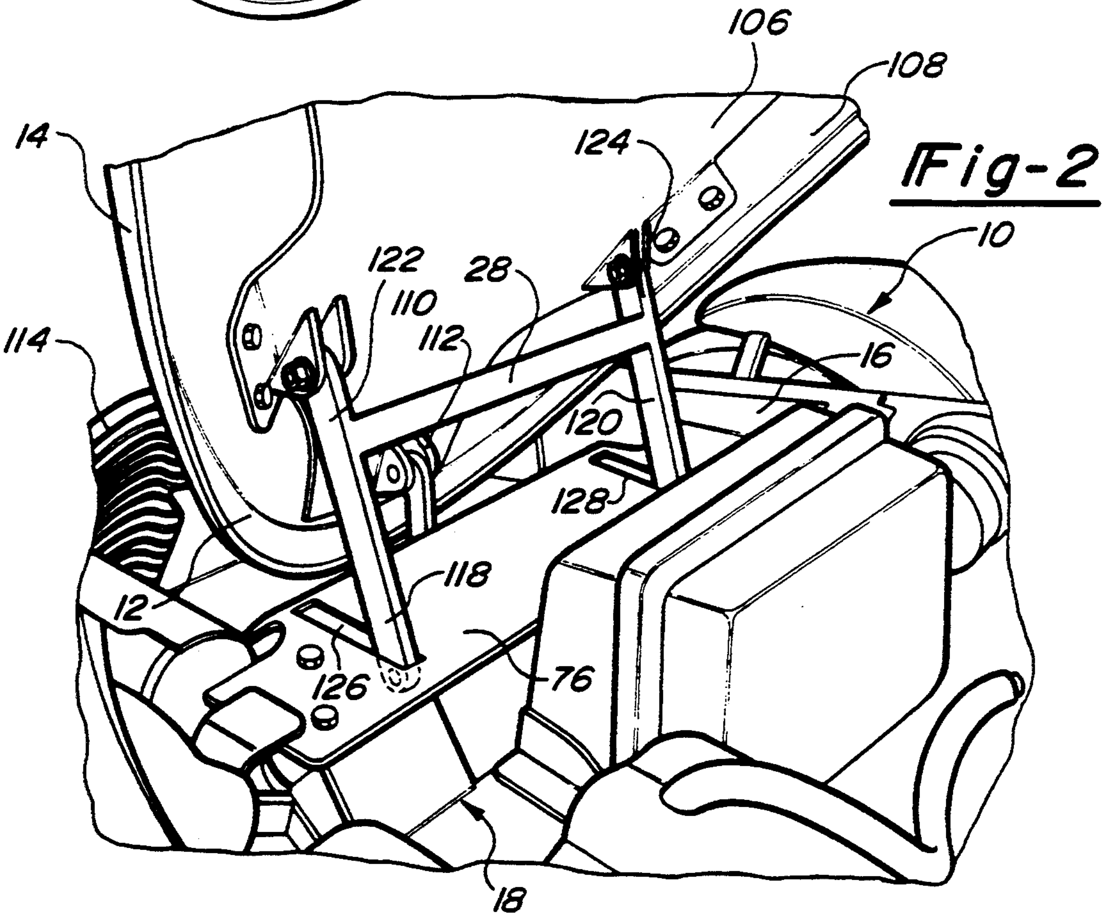
FIG. 2 is an enlarged perspective view of a portion of the vehicle shown in FIG. 1 illustrating the vehicle hood and vehicle hood mounting arrangement in a fully open position.

Referring to FIGS. 1 and 2 of the drawings, a vehicle hood mounting arrangement is indicated by reference numeral 10. As specifically illustrated, the vehicle hood mounting arrangement 10 is adapted to support a forward end 12 of a vehicle hood 14 on a vehicle body 16. The vehicle hood 14 is of conventional construction adapted to enclose a forwardly located engine compartment 18 of a vehicle 20. However, as will be appreciated by those skilled in the art, FIG. 1, as well as the remaining figures, merely illustrate an exemplary embodiment of the present invention. Similarly, the teachings of the present invention are equally adaptable for supporting the rear end of a hood. The teachings of the present invention are also adaptable for supporting other vehicle compartment body panels, such as deck lids and the like.

Figure 4A:
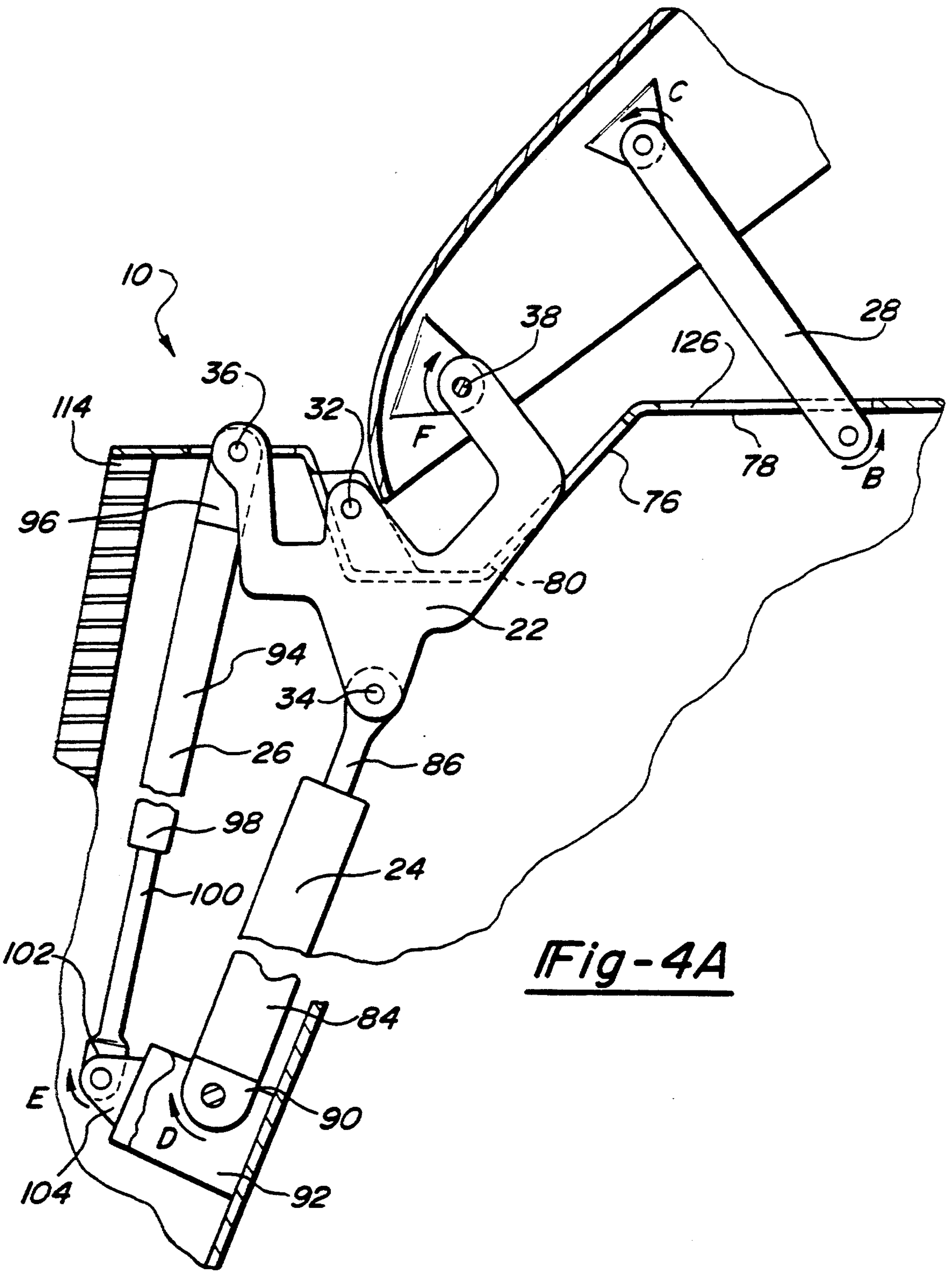
FIGS. 4A through 4C are cross-sectional views of the hood mounting arrangement of FIG. 1, shown throughout various stages of rotation.
Figure 4B:
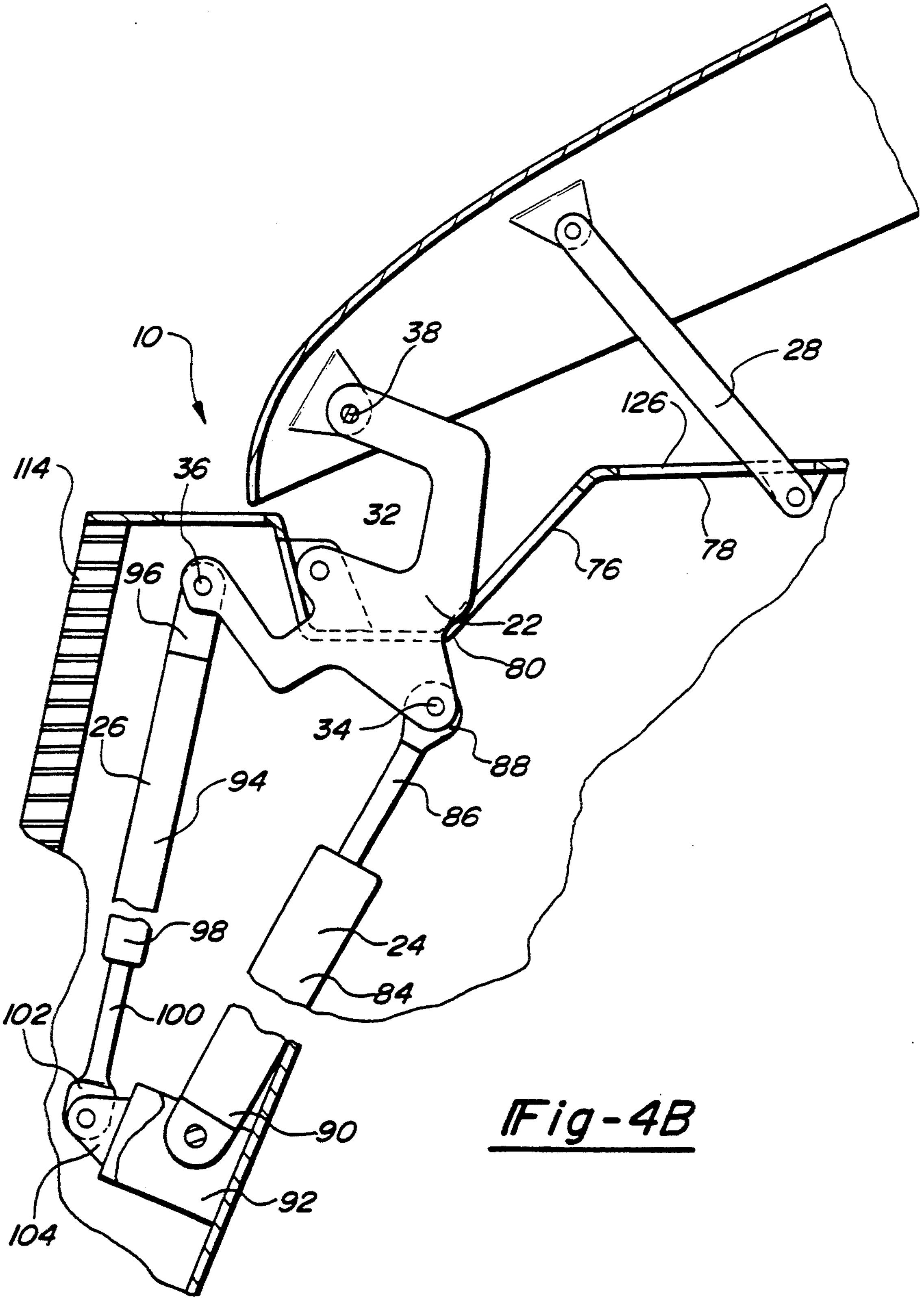
Figure 4C:
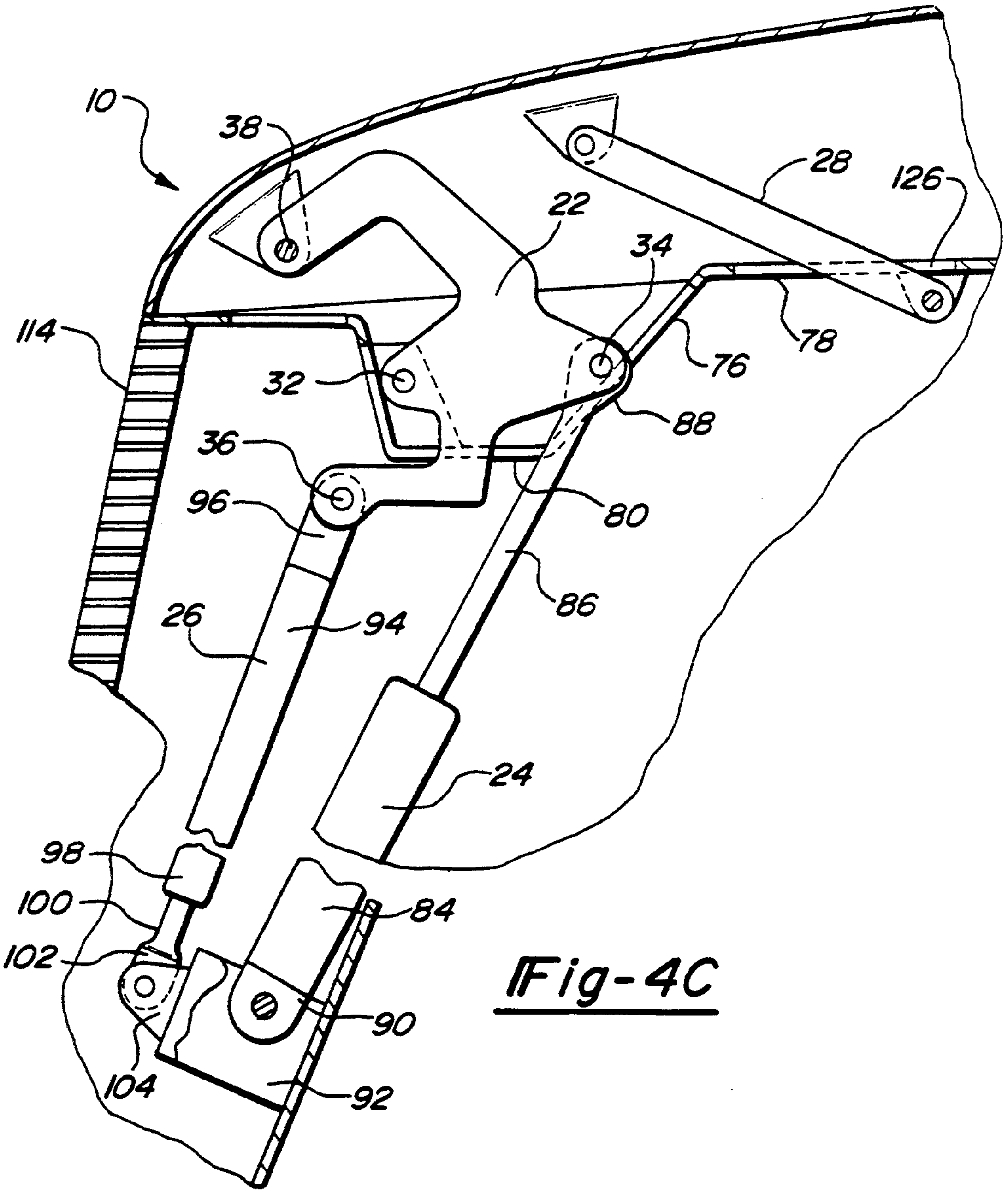

As can be seen most clearly in FIGS. 4A–4C, the vehicle hood mounting arrangement 10 of the present invention includes a hinge member 22, an actuator 24, a damper 26 and a linkage member 28. Much of the remainder of this description focuses upon the interrelationship between these elements as they collectively cooperate to raise and lower the associated vehicle hood 14. As will be discussed in greater detail below, the vehicle hood mounting arrangement 10 of the present invention provides an arrangement that supports the vehicle hood 14 for generally pivotal movement about a transitory axis of rotation between the fully open position (as shown in FIG. 4A) and the fully closed position (as shown in FIG. 4C) relative to the compartment opening 18.

Figure 3:
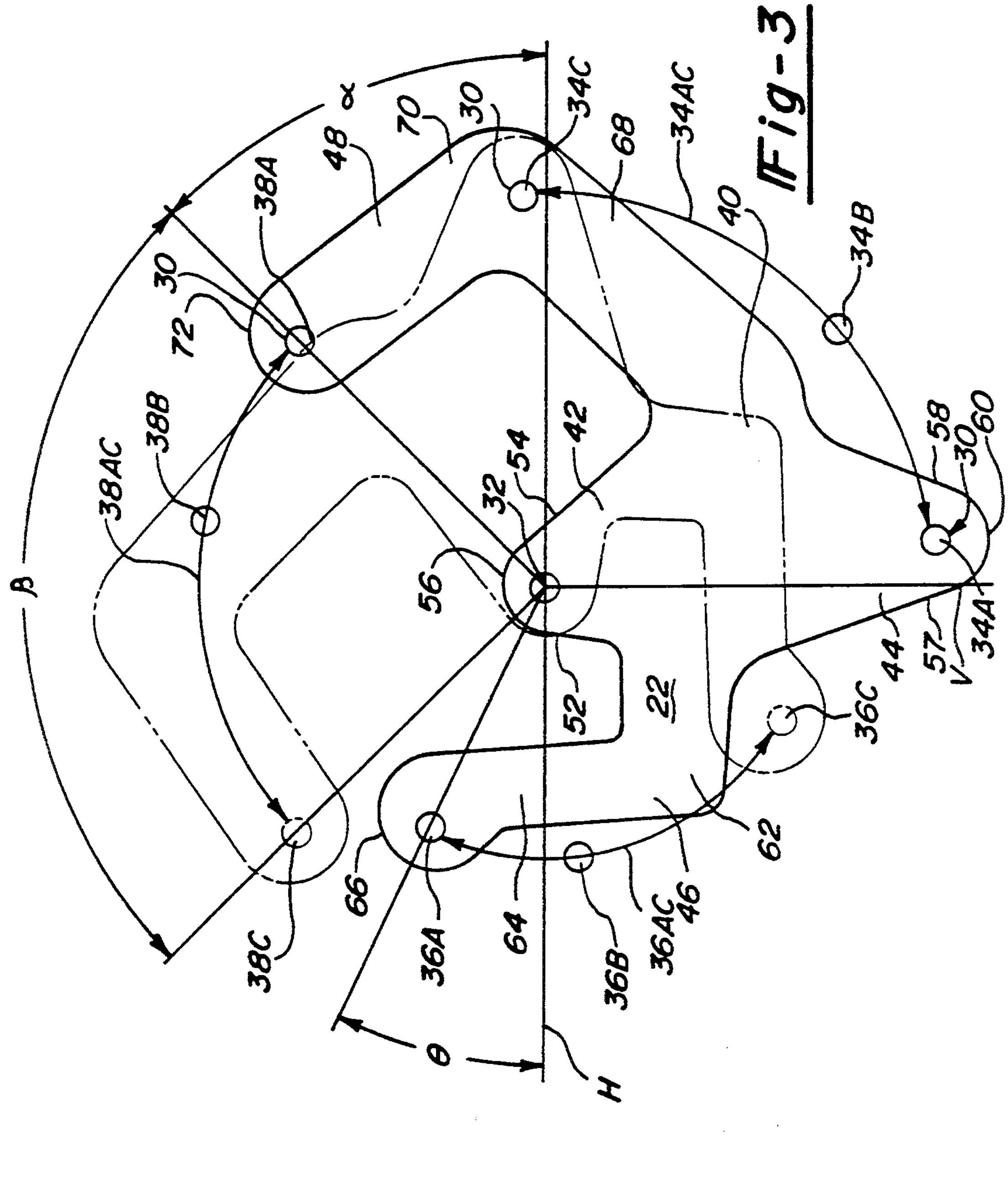
FIG. 3 is a partially schematic representation indicating the relative movement of the axes of rotation of the hinge member between a fully open position (shown in solid lines) and a fully closed position (shown in hidden lines)

Referring to FIG. 3, the hinge member 22 of the present invention is generally flat and planar and preferably constructed of steel or the like material. In the preferred embodiment, the hinge member 22 is formed to include four apertures 30. As is commonly known in the art, each aperture 30 is similarly adapted to receive a pin. The pins facilitate pivotal attachment by defining four corresponding axes of rotation 32, 34, 36 and 38. As will be discussed in more detail below, the construction of the hinge member 22 allows simultaneous horizontal translation and rotation of the vehicle hood 14 with respect to the remainder of the vehicle body 16 as the hood 14 moves between an open position (as shown in FIG. 4A) and a closed position (shown in FIG. 4C). The orientation of the first, second, third and fourth axes of rotation 32, 34, 36, 38, with respect to each other governs the relationship between horizontal translation and rotation of the vehicle hood 14.

With continued reference to FIG. 3, a partially schematic representation of the hinge member is illustrated with the axes of rotation 32, 34, 36, 38 each identified during an open position, an intermediate position, and a closed position. The open, intermediate and closed locations of the axes of rotation 32, 34, 36, 38 correspond with the three positions illustrated in FIGS. 4A, 4B and 4C, respectively. For ease of reference, FIG. 3 identifies each axis of rotation position with a reference numeral corresponding to the particular axis followed by a reference letter (A, B or C) corresponding to FIGS. 4A, 4B and 4C (e.g., the position of the axis of rotation 38 corresponding to FIG. 4B is identified as 38B in FIG. 3). With reference to FIG. 3, the hinge member 22 will be described in further detail.

The hinge member 22 preferably includes a main body portion 40 having first, second, third and fourth arms 42, 44, 46, 48 extending therefrom. The dependent arms 42, 44, 46, 48 include the four apertures 30 which define the first, second, third and fourth axes of rotation 32, 34, 36, 38, respectively. As shown in FIG. 3, the first arm 42 is generally triangular in shape and extends vertically upward with first and second sides 52, 54 interconnected by a rounded apex 56. The first axis of rotation 32 is located adjacent the rounded apex 56.

The second arm 44 is substantially triangular in shape and extends vertically downward. The second arm 44 includes first and second sides 57, 58 which are interconnected by a rounded apex 60. The aperture 30 defining the second axis of rotation 34 is located adjacent the rounded apex 60 counterclockwise of the second dependent portion 44. The second axis of rotation 34 is offset slightly from a vertical line V passing through the first axis of rotation 32.

The third arm 46 is substantially L-shaped in configuration and includes a first leg 62 and a second leg 64 dependent therefrom. As shown in FIG. 3, the first leg 62 extends substantially horizontally. The second leg 64 is substantially perpendicular to the first leg 62 and extends upwardly. The aperture 30 defining the third, axis of rotation 36 is located at a free end 66 of the second leg 64 of the third arm 46. The third axis of rotation 36, as further shown in FIG. 3, is disposed at a first angle $\theta$ of approximately 30° clockwise from a horizontal line H passing through the first axis of rotation 32.

The fourth arm 48 is also substantially L-shaped and includes a first leg 68 and a second leg 70 dependent therefrom. The second leg 70 of the fourth arm 48 is disposed substantially perpendicular to the first leg 68. The aperture 30 forming the fourth axis of rotation 38 is located in a free end 72 of the second leg 70. The fourth arm 48, and as shown in FIG. 3, is disposed at a second angle $\alpha$ of approximately 60° counterclockwise from the horizontal line H passing through the first axis of rotation 32.

As shown in FIGS. 4A–4C, at the first axis of rotation 32 the hinge member 22 is pivotally attached to the vehicle body 16. More specifically, the hinge member 22 is pivotally attached to a panel 76 which extends across the forwardmost portion of the vehicle engine compartment 18. The panel 76 includes an upper portion 78 and a lower portion 80 and is firmly attached to the vehicle body 16.

At the second axis of rotation 34, the hinge member 22 is pivotally attached to an actuation means for rotating of the hinge member 22 about the first axis 32. In the preferred embodiment, the actuation means for rotating the hinge member 22 comprises a pneumatic actuator 24. However, it will be appreciated by those skilled in the art, that any suitable mechanism for rotation of the hinge member 22 about the first axis of rotation 32 can be substituted therefor.

The pneumatic actuator 24 of the present invention includes a main body portion 84 and an extendable arm portion 86. The extendable arm portion 86 terminates at a ting-like end 88 which is adapted to receive the pin which passes through the aperture 30 of the hinge member 22 defining the third axis of rotation 36. At a lower end 90, the main body portion 84 of the pneumatic actuator 24 is pivotally attached to a bracket member 92, thereby fixing the lower end 90 of the pneumatic actuator 24 relative to the vehicle body 16. Preferably, the pneumatic actuator 24 is adapted to be controlled by a two-way switch or button (not shown) located in the vehicle passenger compartment (not shown). The extendable arm portion 86 is operative for movement between a fully extended position (as shown in FIG. 4C) and a fully contracted position (as shown in FIG. 4A). As is known in the art, the pneumatic actuator 24 permits incremental extension of the extendable arm portion 86 to thereby allow selective positioning of the vehicle hood 14 at any position between its fully open position and its fully closed position. As will be discussed in further detail below, extension of the extendable arm portion 86 causes the hinge member 22 to rotate counterclockwise (as indicated by arrow D in FIG. 4A) as viewed from the left-hand side of the vehicle 20 (as shown throughout the figures), and thereby move the vehicle hood 14 towards a closed position.

At the third axis of rotation 36, the hinge member 22 is pivotally attached to the damper 26. The damper 26 limits the speed of rotation of the hinge member 22 about the first axis of rotation 32, and thereby limits the speed with which the vehicle hood 14 opens and closes. Preferably, the damper 26 includes a main body portion 94 having an upper end 96 adapted to receive the pin passing through the third axis of rotation 36 for pivotal attachment to the hinge member 22 and a lower end 98 which telescopically receives an extendable arm 100. The extendable arm 100 is pivotally attached at a first end 102 to a bracket 104, thereby fixing the first end 102 relative to the vehicle body 16.

The extendable arm 100 of the damper 26 is adapted for movement between a fully contracted position (as shown in FIG. 4C) and a fully extended position (as shown in FIG. 4A). As will be discussed in further detail below, as the hinge member 22 is rotated counterclockwise as viewed from the left-hand side of the vehicle 20, the extendable arm 100 of the damper 26 moves towards its fully contracted position. Thus, when the vehicle hood 16 is in its fully closed position, the extendable arm 100 of the damper 26 is in a fully contracted position.

At the fourth axis rotation 38, the hinge member 22 is pivotally attached to the forward end 12 of the vehicle hood 14. More specifically, as shown in FIG. 2, the fourth axis of rotation 38 is pivotally mounted to a reinforcing panel 106 attached to the underside 108 of the vehicle hood 14. As shown in FIG. 2, the forward end of the reinforcing panel 106 is formed to include first and second adjacent outwardly extending portions 110, 112, between which the free end 72 of the second leg 70 of the fourth dependent arm 48 is positioned.

As shown throughout the drawings, the pneumatic actuator 24 and the damper 26 are located between a forward end of the engine compartment 18 and a removable grill 114. The advantages of this location is two-fold. First, the pneumatic actuator 24 and the damper 26 can be easily accessed by removing the grill 114. Secondly, the location of these components does not unnecessarily limit the usable area of the engine compartment 18. In addition, in a fully closed position (as shown in FIG. 4C) the vehicle hood 14 does not extend beyond the grill 114.

The vehicle hood mounting arrangement 10 of the present invention further includes the linkage member 28 which serves to support and stabilize the vehicle hood 16. Preferably, the linkage member 28 is H-shaped in construction and has first and second lower legs 118, 120 and first and second upper legs 122, 124 as seen in FIG. 2. The first and second lower legs 118, 120 are substantially longer in length than the first and second upper legs 122, 124. The first and second lower legs 118, 120 pass through first and second slots 126, 128, respectively, formed in the upper portion of the panel 76 and are each pivotally connected to the vehicle body 16. The first and second upper legs 122, 124 are preferably pivotally attached to the panel 106 mounted to the underside 108 of the vehicle hood 14. Viewed from the left-hand side of the vehicle 20, as the vehicle hood 14 is moved from a fully open position to a fully closed position the linkage member 28 rotates counterclockwise relative to the vehicle hood 14 (as indicated by arrow B in FIG. 4A). Simultaneously, the linkage member 28 rotates counterclockwise relative to the remainder of the vehicle body 20 (as indicated by arrow C in FIG. 4A).

Referring to FIG. 3, as the hinge member is rotated from a fully open position to a fully closed position, the fixed location of the first axis of rotation 32 causes the remaining three axes 34, 36, and 38 to travel along three distinct arcuate paths 34AC, 36AC and 38AC, respectively. Each path is approximately 90° (see e.g. angle $\beta$ corresponding to the arcuate path 38AC). With additional reference to FIGS. 4A–4C, the operation of the vehicle hood mounting arrangement 10 of the present invention as heretofore described will now be discussed. As shown in FIG. 4A, the vehicle hood 14 is in its fully open position. For the remainder of this discussion regarding the operation of the present invention, terms of reference such as clockwise and counterclockwise will be understood to be taken from a vantage point similar to that shown throughout the figures—from the left-hand side of the vehicle 20. When the hood 14 is in its fully open position, the extendable arm 86 of the pneumatic actuator 24 is fully contracted, the extendable arm 100 of the damper 26 is fully extended and the linkage member 28 is positioned approximately 30 degrees counterclockwise from a vertical plane. As discussed previously, the pneumatic actuator 24 is controlled through a switch (not shown) located in the passenger compartment (not shown). To move the vehicle hood 14 from its fully open position (FIG. 4A) towards its fully closed position (FIG. 4C), pneumatic pressure to the actuator 24 is decreased. As will be appreciated by those skilled in the art, this decrease in pneumatic pressure allows the spring force of the pneumatic actuator 24 to overcome the pneumatic pressure and thereby results in extension of the extendable arm 86.

Turning to FIG. 4B, illustrated is an intermediate vehicle hood position between the fully open position of FIG. 4A and the fully closed position of FIG. 4C. Between the fully opened position of FIG. 4A and the intermediate position of FIG. 4B, the extendable arm 86 of the pneumatic actuator 24 rotates the hinge member 22 approximately 20 degrees about the first axis of rotation 32. During this rotation of the hinge member 22, the pneumatic actuator 24 rotates slightly clockwise about its lower end 90 (as indicated by arrow D in FIG. 4A). Additionally, the damper 26 similarly rotates slightly clockwise about its lower end 102 (as indicated by arrow E in FIG. 4A). Simultaneously, the extendable arm 100 of the damper 26 moves from a fully extended position to an intermediate position and thereby dampens the speed with which the vehicle hood 14 is permitted to close. The H-shaped linkage member 28 rotates counterclockwise relative to the vehicle body 16, as indicated by arrow B. During this rotation, the first and second lower legs 118, 120 are permitted to pass through the first and second slots 126, 128 formed in the panel 76 which passes across the engine compartment 18.

Between the fully open position of FIG. 4A and the intermediate position of FIG. 4B, simultaneously, the fourth axis of rotation 38 translates horizontally forward and the vehicle hood 14 rotates with respect to the fourth axis of rotation 38 (as indicated by arrow F in FIG. 4A). The configuration of the hinge member 22, particularly the fourth dependent portion 48 thereof and the relative locations of the first and fourth axes of rotation 32, 38, causes a forward-most end of the vehicle hood 14 to shift slightly upwardly and horizontally towards the extreme front of the vehicle 20 during the initial rotation of the vehicle hood 14 from its fully open position towards the intermediate position.

Between the intermediate position of FIG. 4B and the fully closed position of FIG. 4C, the extendable arm 86 of the pneumatic actuator 24 moves towards a fully extended position and the extendable arm 100 of the damper 26 moves towards a fully contracted position. Extension of the extendable arm 86 of the pneumatic actuator 24 to the fully extended position causes the hinge member 22 to complete a rotation of approximately 90° (see angle $\beta$ in FIG. 3) about the first axis of rotation 32. During the final stage of closure of the vehicle hood 14, the configuration of the fourth arm 48 of the hinge member 22 causes the vehicle hood 14 to forwardly translate horizontally and also urges the vehicle hood 14 slightly downwardly.

While the operation of the present invention has been described in detail from a fully open position to a fully closed position, it will be appreciated by those skilled in the art that the process of moving the vehicle hood 14 from a closed position to a fully open position can be accomplished in reverse order.

While the above detailed description describes the preferred embodiment of the present invention, it will be understood that the present invention is susceptible to modification, variation and alteration without deviating from the scope and fair meaning of the subjoined claims.

What is claimed is:

1. A vehicle hood mounting arrangement for a vehicle having a body and a forwardly located engine compartment partially defined by a pivotally mounted vehicle hood moveable between an open position and a closed position, said vehicle hood mounting arrangement comprising:

a hinge member having a first axis of rotation passing therethrough and being pivotally interconnected to said body at said first axis of rotation for rotation thereabout, said hinge member further having a second axis of rotation passing therethrough and being pivotally interconnected at said second axis to said vehicle hood, said hinge member also including means for translating said second axis horizontally forward with respect to said body and rotating said hood with respect to said first axis as said hood moves from said open position to said closed position; and actuation means for rotating said hinge member about said first axis of rotation.

2. The vehicle hood mounting arrangement of claim 1, wherein said actuation means comprises a pneumatic actuator pivotally interconnected to said hinge member and to said vehicle.

3. The vehicle hood mounting arrangement of claim 2, further comprising a damper for limiting speed of rotation of said hinge member about said first axis of rotation, said damper being interconnected to said hinge member and said vehicle.

4. The vehicle hood mounting arrangement of claim 1, further comprising an H-shaped linkage member having first and second lower legs pivotally interconnected to said vehicle body, said linkage member further having first and second upper legs pivotally interconnected to said vehicle hood.

5. A-mounting arrangement for a vehicle having a main body including an engine compartment with a forward end and a hood pivotally connected at said forward end for movement between a closed position and an opened position, said mounting arrangement comprising:

a hinge member having a first axis of rotation passing therethrough and being pivotally interconnected to said body at said first axis of rotation for rotation thereabout, said hinge member further having a second axis of rotation passing therethrough and being pivotally interconnected at said second axis of rotation to said vehicle hood, said hinge member including means for translating said second axis horizontally forward with respect to said main body as said hood is moved from an open position to a closed position;

an H-shaped linkage member pivotally interconnected at spaced apart points to said hood, said linkage further being pivotally interconnected to said body at spaced apart points; and actuation means for rotating said hood between said open position and said closed position and horizontally translating said hood with respect to said main body.

6. The mounting arrangement of claim 5, wherein said actuation means comprises a pneumatic actuator pivotally interconnected to said hinge member and to said vehicle body.

7. The mounting arrangement of claim 6, further comprising damper means for limiting the speed of rotation of said hinge member about said first axis of rotation.

8. The mounting arrangement of claim 7, wherein said H-shaped linkage member includes first and second lower legs pivotally interconnected to said main body and first and second upper legs pivotally interconnected to said hood.

9. A vehicle hood for covering an engine compartment of a vehicle when in a lowered position having an improved means for controlling articulated movement of said vehicle hood as said hood is moved between a raised position and said lowered position, said improvement comprising:

a linkage member coupled to said vehicle and coupled to said hood that provides a frame for supporting said vehicle hood when in said raised position, said linkage member being moveable to a storage position when said vehicle hood is in said lowered position;

hinge means operatively associated with said vehicle and said vehicle hood for horizontally translating said vehicle hood forward as said vehicle hood is from said raised position and said lowered position; and means for actuating said hood to move between said raised position and said lowered position, said means for actuating being operatively associated with said hinge means.

10. The vehicle hood of claim 9, wherein said hinge means comprises a hinge member articulately interconnected to said hood and to said vehicle.

11. The vehicle hood of claim 10, wherein said hinge member has first and second axes of rotation passing therethrough, said hinge member being pivotally interconnected to said vehicle at said first axis of rotation and pivotally attached at said second axis of rotation to said hood.

12. The vehicle hood of claim 11, wherein said means for actuating said hood comprises a pneumatic actuator pivotally attached to both said hinge member at a third axis of rotation passing through said hinge members and to said vehicle.

13. The vehicle hood of claim 12, wherein said pneumatic actuator includes an extendable arm, and further wherein said extendable arm is adapted to be retracted when said hood is in said lowered position and extended when said hood is in said raised position.

14. The vehicle hood of claim 12, further comprises damper means for limiting the speed of rotation of said hinge member about said first axis of rotation, said damper means being pivotally attached to said hinge member for rotation about a fourth axis of rotation passing through said hinge member.

15. The vehicle hood of claim 14, wherein said linkage member comprises an H-shaped member having first and second lower legs pivotally interconnected to said vehicle, and first and second upper legs pivotally interconnected to said hood.

16. The vehicle hood of claim 14, wherein said hinge member includes first and second substantially L-shaped portions having first and second dependent legs, respectively, said second and fourth axes of rotation passing through said first and second dependent legs, respectively.

17. A vehicle hood mounting arrangement for a vehicle having a body and a forwardly located engine compartment partially defined by a pivotally mounted vehicle hood moveable between an open position and a closed position, said vehicle hood mounting arrangement comprising:

a hinge member having a first axis of rotation passing therethrough and being pivotally interconnected to said body at said first axis of rotation for rotation thereabout, said hinge member further having a second axis of rotation passing therethrough and being pivotally interconnected at said second axis to said vehicle hood, said hinge member also including means for simultaneously translating said hood horizontally and rotating said hood with respect to said first axis as said hood moves between said open position and said closed position;

actuation means for rotating said hinge member about said first axis of rotation;

an H-shaped linkage member having first and second lower legs pivotally interconnected to said vehicle body, said linkage member further having first and second upper legs pivotally interconnected to said vehicle hood; and a panel member extending substantially laterally across said engine compartment, said panel member being attached to said vehicle body, said first and second lower legs of said H-shaped linkage member being pivotally attached to said panel member.

18. The vehicle hood mounting arrangement of claim 17, wherein said panel member includes an upper portion and a lower portion, and further wherein said first and second lower legs are pivotally attached below said upper portions.

* * * * *